Patented Apr. 29, 1941

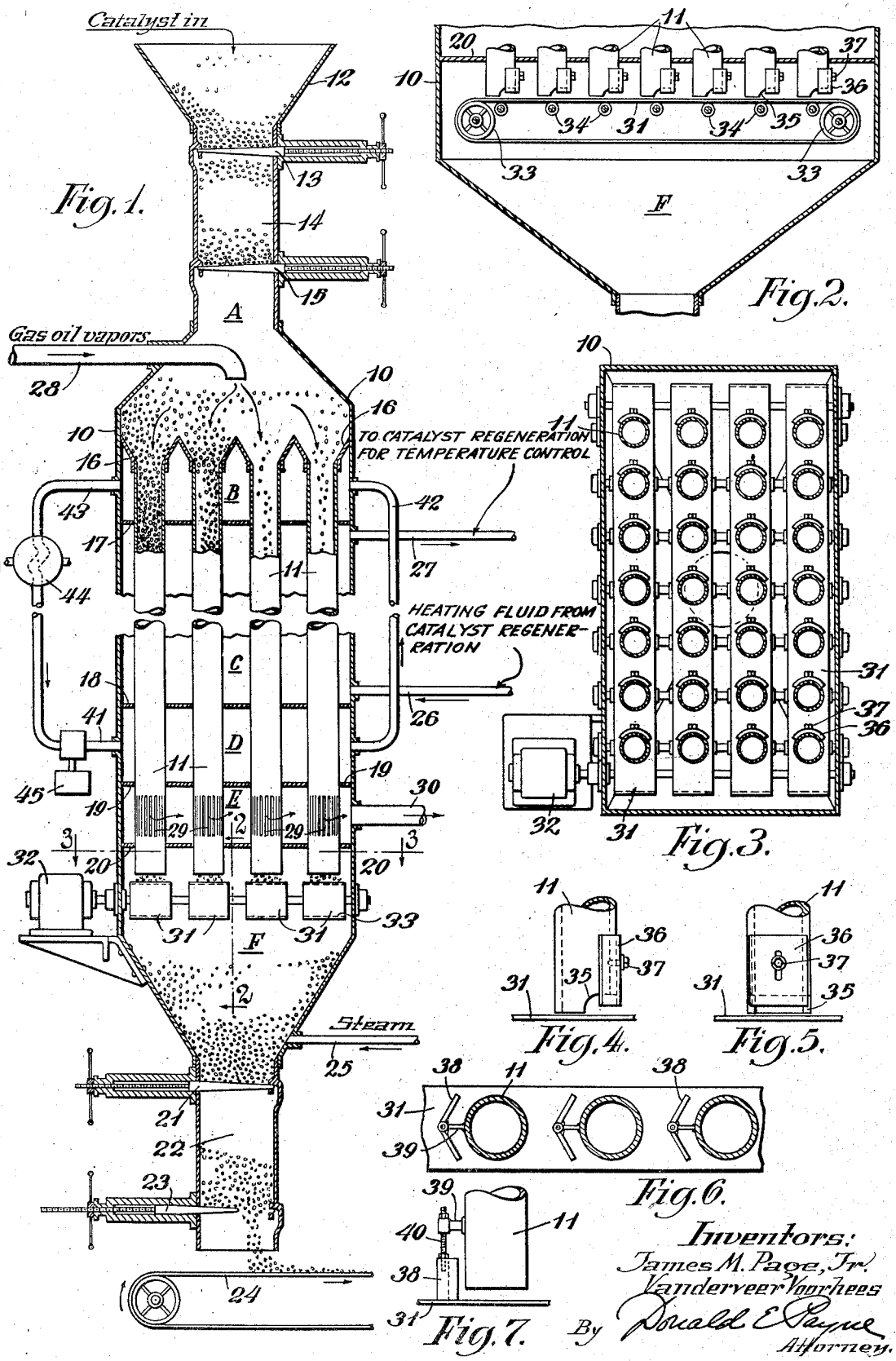

2,240,347

UNITED STATES PATENT OFFICE 2,240,347

CATALYTIC CONVERSION SYSTEM

James M. Page, Jr., Chicago, Ill., and Vanderveer Voorhees, Hammond, Ind., assignors to Standard Oil Company, Chicago, Ill., a corporation of Indiana Application December 31, 1938, Serial No. 248,855

11 Claims. (Cl. 196—52)

This invention relates to a catalytic conversion system and it pertains more particularly to means for effecting such conversion continuously. Primarily the invention is designed for a continuous catalytic cracking process of the moving bed type.

An object of the invention is to provide an improved catalyst reaction chamber for handling a moving catalyst bed. A further object is to provide improved means for regulating the flow of catalyst material through vertical tubes. A further object is to provide an improved catalyst conversion system that may be employed for the catalytic cracking of hydrocarbons to form motor fuel, the catalytic dehydrogenation of hydrocarbons, and other catalytic conversion processes.

Since cracking catalysts must be periodically regenerated, the cycle time varying from 10 or 15 minutes to several hours, in systems of the fixed bed type accurate temperature control is practically impossible because the temperature is necessarily higher during regeneration than it is during the on-stream period, and the temperature will vary within fairly wide limits both during the regeneration step and during the on-stream step. An object of our invention is to provide a catalytic cracking chamber wherein there is a continuous flow of catalyst through the chamber so that each part of the system is maintained at constant temperature for indefinite periods of time. Such a system not only insures uniformity of reaction products, but it greatly simplifies the operation of the system and avoids the physical strain on the system which inevitably results from constant intermittent temperature changes. Attack of the cracking apparatus by regenerating gases is also avoided.

In practicing our invention we continuously pass a catalyst such as activated clay or silica gel impregnated with certain metal oxides through long vertical tubes. As the catalyst flows through the tubes it is first preheated, then subjected to catalytic cracking temperature, then cooled, and finally discharged in regulated amounts by an improved continuous belt system which forms a special feature of the invention. Hydrocarbon vapors are preferably passed through these catalyst tubes concurrent with the flow of catalyst therein since counter-current flow tends to prevent the downward flow of catalyst in the tubes. Our invention is applicable, however, to both concurrent and counter-current contact.

It is essential in the moving bed type of catalyst system that the catalyst flow in all of the tubes be uniform and carefully regulated. Ordinary valves cannot be used, first, because they fail to insure uniform flow on account of the tendency of the granular material to bridge, and second, because of a tendency to grind and disintegrate the catalyst granules. In our system the lower ends of the catalyst tubes are slightly spaced from a horizontally moving link belt. The catalyst flows out of the tube onto the belt in a thin layer and the horizontal movement of the belt thus insures the uniform flow of catalyst from the tubes without any shearing or undue abrasion of the catalyst particles. The rate of catalyst flow through the tubes may be regulated by regulating the speed of the belt, the distance of the belt from the tubes, or by individual regulating means secured to the end of each tube.

The invention will be more clearly understood from the following detailed description read in connection with the accompanying drawing which forms a part of this disclosure and in which:

Fig. 1 is a vertical section of our improved catalyst chamber;

Fig. 2 is a detail vertical section taken along the lines 2—2 of Fig. 1;

Fig. 3 is a horizontal section taken along the lines 3—3 of Fig. 1;

Fig. 4 is an enlarged vertical section showing one form of catalyst discharge control;

Fig. 5 is a side view of the control shown in Fig. 4;

Fig. 6 is a horizontal section showing a modified catalyst flow regulating means; and Fig. 7 is a detailed side view of the flow means illustrated in Fig. 6.

The invention will be described in connection with the catalytic cracking of Mid-Continent gas oil, but it should be understood that the invention is equally applicable to other hydrocarbon conversion processes such as dehydrogenation, isomerization, alkylation, polymerization, etc. Also, certain features of the invention are applicable to fields outside of the petroleum industry.

It should also be understood that the catalytic cracking process may be used on any charging stock ranging from heavy naphtha to heavy residual stocks and ranging in chemical composition from aromatic or naphthenic oils or extracts to highly paraffinic stock such as solvent refined oils and even paraffin wax itself.

For catalytic cracking we prefer to employ activated hydrosilicates of alumina such as acid-treated clay or silica gel impregnated with the oxides of such metals as aluminum, copper, nickel, manganese, cadmium, etc. The catalysts may be of the extruded or pelleted type but, particularly in the case of silica gel catalysts, we prefer to employ granules screened to pass a $\frac{1}{8}$ inch screen and be retained on a 10 mesh screen. The catalyst per se forms no part of our present invention and it will not be described in further detail.

For high pressure reactions the catalyst chamber may be cylindrical, but for the purpose of catalytic cracking we may use a rectangular vessel 10 in which are mounted a plurality of rows of tubes 11. These tubes may be of ordinary steel or a chromium iron alloy containing about 26% chromium, although any other suitable alloy may be used which will withstand corrosion under the temperature conditions employed. They may be about 3 or 4 inches in diameter, about $\frac{1}{8}$ to $\frac{1}{4}$ of an inch thick and about 30 to 40 feet long.

The catalyst is introduced from hopper 12 through gate valve 13 into compartment 14. Slide valve 13 is then closed and valve 15 is opened so that the catalyst from compartment 14 falls into the space A above the tops of the catalyst tubes. Valves 13 and 15 form a "gas lock" mechanism which prevents the escape of gas oil vapors from chamber 10.

The upper ends of catalyst tubes 11 are welded to tube sheet 16 which is deformed to provide small hoppers at the top of each tube, and to take care of expansion. A second tube sheet 17 which is spaced from two to five feet below the tube sheet 16 and is welded to the tubes and the chamber walls, respectively, forms a space B for preheating fluids. A third tube sheet 18, which is likewise welded to the tubes and chamber walls respectively, is spaced about eight to twelve feet below tube sheet 17, leaving a space C for the circulation of heating fluids to effect catalytic cracking.

A fourth tube sheet 19, likewise welded to the tubes and catalyst chamber respectively, is about three to five feet below tube sheet 18, and it forms space D for cooling fluids around the catalyst tubes. A fifth tube sheet 20 leaves a space E for the discharge of reaction products from the tubes.

The catalyst discharged from the bottoms of the tubes into space F, is removed therefrom by opening slide valve 21, filling compartment 22 with catalyst, then closing valve 21 and opening valve 23. The discharged catalyst may be picked up by a belt conveyor or bucket elevator 24, and withdrawn to a rotary kiln for regeneration.

Steam or nitrogen is introduced thru line 25 to strip oil and vapors out of the catalyst and to maintain the necessary back pressure at the lower ends of the tubes to prevent reaction products from flowing into chamber F. This stripping gas enters the bottoms of the tubes 11 and is discharged into space E along with reaction products.

Heating fluid for effecting the catalytic conversion is introduced into space C through line 26 and withdrawn therefrom through line 27. This heating fluid may be hot flue gases from the catalyst regeneration system, hot flue gases from the gas oil heating furnace or hot gases from any other source. For closer temperature control we may employ liquid heat transfer means such as mercury, diphenyl or fused salts—for instance a mixture of sodium nitrate, potassium nitrate and sodium nitrite. If the catalyst is regenerated in a "wedge" type burner the heat transfer fluid may be passed through hearth coils or pancake coils for controlling the heat of regeneration and absorbing heat therefrom. The heat transfer fluid thus heated in the regeneration step may be introduced through line 26 to supply the heat of catalytic cracking. Where mercury is used as a heat exchange medium under pressure the mercury may be vaporized by the heat of catalyst regeneration and the mercury vapors introduced through line 27 into space C. The condensation of mercury around the catalyst tubes will supply the heat of cracking and the condensed mercury may be withdrawn through line 26 for further heating.

Instead of employing the heat of regeneration for effecting the catalytic cracking we may employ it for the generation of power, and we may use flue gases from the gas oil heating system for heating the tubes 11 in space C. For instance, space C may itself form the convection section of the pipe still furnace used for heating the gas oil.

The gas oil or other charging stock is preferably heated in a pipe still to a temperature of about 700 to 850° F. i. e. to a temperature below that at which any substantial cracking takes place in the short time that the oil vapors remain in the heating coil. If heavy stocks are employed a small amount of steam may be introduced with the charge to effect complete vaporization of the stock. The hot gas oil vapors introduced through line 28 into space A may pass downwardly through tubes 11 concurrent with the catalyst flow. The reaction products leave the tubes through a plurality of vertical slots 29 and are withdrawn from space E through line 30 to a conventional recovery system which may consist of a fractionating column, stabilizer, de-ethanizer, etc. for separating the cycle gas oil (products heavier than gasoline), gasoline, $C_3$ and $C_4$ hydrocarbons and lighter gases, respectively. The recovery system forms no part of the present invention and it will not be described in further detail.

In a process of this type it is important that the catalyst flow be uniform in all of the tubes, and that the catalyst flow be effected without shearing and disintegration of the catalyst particles. To effect uniform catalyst flow we provide a horizontally-moving belt 31 immediately underneath the lower ends of the tubes. This may be a single belt or a separate belt may be used under each row of tubes. If a single belt is used, it may be slotted between tube rows to provide for discharge of spent catalyst therethru. The belts are driven by a suitable motor or driving mechanism 32 and they are supported at the ends by rollers 33 and along their length by a plurality of rollers 34. The belts are preferably of the link-belt type consisting of pivotally mounted flat metal sheets, although it should be understood that any other suitable material may be used, such as sheet steel or other sheet metal.

With the upper part of the belt moving from left to right as indicated in Figs. 2, 4, 6 and 7, the left-hand side of each tube 11 may extend to the belt itself and act as a deflector for pushing aside any catalyst already on the belt. In the lower right hand side, the tube has a cut away portion 35 which permits catalyst to flow out of the tube onto the belt and to be carried away from the tube by the belt in a thin layer. The thickness of this layer may be regulated by a slidable plate 36 which may be secured in any desired position by set screw 37, as illustrated in Figs. 4 and 5. Thus the catalyst flow from each tube may be carefully controlled by the position of sliding plate 36, and the catalyst flow through a whole row of tubes may be controlled by changing the speed of the belt.

Instead of deflecting catalyst from the belt by the tube itself we may space the bottoms of the tubes from the belt and employ auxiliary deflectors 38 which are secured to the base of the tubes by bracket 39 and are raised from or lowered toward the belt by set screw 40. Deflectors 38 may be in actual contact with the belt or may be spaced from the belt at such a distance as to prevent any grinding or disintegration of catalyst. These deflectors serve to control the depth of deposit on the belt immediately before and after each catalyst tube, and thus they control the rate at which catalyst is discharged from each tube. Such deflectors serve to regulate the catalyst flow through each separate tube. It will be obvious, of course, that auxiliary deflector 38 will serve no function on the first tube of each series; this tube may be positioned slightly closer to the belt than the other tubes of the series or it may be provided with slidable plate 36 as hereinabove described in order that the first tube of the system may discharge catalyst at the same rate as the remaining tubes. The rate of flow through all tubes can be regulated by raising and lowering the belt or by changing the speed of the belt.

The above examples are illustrative of many types of scrapers or deflectors which may be employed for controlling the rate of catalyst flow from a vertical tube to a horizontally moving belt, and it should be understood that we do not limit ourselves to the particular embodiments herein described. Thus, we may arrange all tubes to end at the same level, then incline the belt slightly to control the amount of catalyst deposit from the successive tubes.

The bottoms of the tubes may, of course, be tapered and shaped to obtain the desired flow of catalyst therefrom in regulated amounts, but it is important to permit the catalyst to flow freely and to avoid all dead spots which might tend to cause coke formation and plugging of the tubes.

When concurrent flow of catalyst and gas oil vapors is employed the slots 29 should be sufficient in number and size to facilitate easy discharge of reaction products, together with the stripping medium (which is introduced thru line 25 for maintaining the desired back pressure and preventing the escape of reaction products to the atmosphere).

With heavy catalysts of relatively large particle size we may employ countercurrent flow. That is, the hot gas oil vapors may be introduced through line 30 and the reaction products withdrawn through line 28. For such operation the cooling space D will preferably be under the hot gas-oil inlet space E and steam or inert gas will be introduced thru line 25 to keep a higher pressure in F than exists in E. Preheating zone B will be unnecessary since the exit reaction products will preheat the incoming catalyst.

For concurrent flow, however, we introduce a cooling fluid through line 41 into space D, and we then pass this heated fluid through line 42 into preheating zone B. The cooled fluid from zone B may be passed through line 43 to a cooler 44 and thence reintroduced by pump 45 and line 41 to the cooling zone. Here again it should be understood that other heating and cooling means may be employed; for instance air may be used as a cooling fluid in zone D and the preheated air may be used for combustion in the pipe still furnace. Flue gas from the pipe still furnace or catalyst regenerator may be used in the zone B instead of the hot gases from zone D. If desired we may also simplify our catalyst chamber by omitting the preheating and cooling sections and employing only two headers, the oil vapors being withdrawn from the ends of the tubes and from space F.

We claim:

1. Apparatus for controlling catalyst flow in a vertical catalyst tube which comprises a horizontally movable element positioned underneath said tube sufficiently close thereto to prevent free flowing of the catalyst between said tube and said element, means for passing a fluid through said tube in contact with the catalyst, means for moving said element in a substantially horizontal plane whereby areas thereof approach, register with and leave a position beneath said tube, means for deflecting catalyst from areas of said element which are approaching said position, means for depositing a layer of catalyst on said element and means for regulating the thickness of the layer of catalyst which is carried away on said element as it leaves said position.

2. The apparatus of claim 1 wherein the element is a continuously moving belt.

3. The apparatus of claim 1 wherein the element is a continuously moving belt and the deflecting means is a part of the tube itself.

4. The apparatus of claim 1 wherein the element is a continuously moving belt and the deflecting means is adjustably secured to the lower end of said tube.

5. Catalyst flow control apparatus comprising a vertical catalyst tube, means for charging a free flowing granular solid catalyst to the upper part of said tube, means for passing vapors through said tube in contact with catalyst contained therein, means immediately beneath said tube for supporting a column of said catalyst in said tube and preventing the free flow of catalyst therefrom, means for moving said supporting means in a substantially horizontal plane, and an adjustable mechanism secured to the base of said tube for regulating an amount of catalyst deposited on said supporting means and removed from said tube in its horizontal movement.

6. The apparatus of claim 5 wherein the adjustable mechanism consists essentially of a movable plate and means for securing said movable plate in fixed position.

7. The apparatus of claim 5 wherein the supporting means consists of a movable belt.

8. In a catalytic conversion system employing moving catalyst beds in a plurality of vertical tubes, means for passing a fluid through said tubes in contact with catalyst beds, a movable belt positioned under the lower ends of said tubes and sufficiently close thereto to prevent free flow of catalyst, means for supporting said belt under said tubes, means for moving said belt, means for depositing on said belt from each tube a layer of catalyst material, and means cooperating with said belt for regulating the thickness of the layer of catalyst material which is deposited by each tube.

9. In apparatus for regulating the flow of catalyst material through a vertical tube without crushing and grinding the catalyst, means for passing a fluid through the vertical tube in contact with the catalyst material, a flat, horizontally movable element positioned under said tube and sufficiently close to said tube to prevent free flow of catalyst but sufficiently spaced from said tube to prevent shearing and abrasion of catalyst particles, means for moving said flat element in a substantially horizontal plane, whereby a layer of catalyst is deposited thereon by said tube, and means cooperating with said flat element for regulating the thickness of said layer on opposite sides of said tube.

10. In apparatus of the kind described, a row of vertical catalyst tubes with their lower ends in a substantially horizontal plane, means for passing a fluid through said catalyst tubes in contact with the catalyst, a flat, movable element supported under said row of tubes sufficiently close to the tube ends to prevent free flow of catalyst, and spaced from said tube ends at a distance greater than the thickness of the catalyst particles, means for supporting said element and for moving it in a horizontal direction and means carried by said tubes for regulating the depth of the layer of catalyst which is deposited on said element by its horizontal motion underneath said tubes.

11. In catalytic apparatus, a catalyst chamber, a plurality of vertical tubes in said catalyst chamber, means for maintaining said tubes full of catalyst, means for effecting uniform flow of catalyst through said tubes, said last means including a horizontally movable belt with means in front of each catalyst tube for deflecting catalyst material on said belt and means in back of each catalyst tube for permitting the deposit of a layer of catalyst material on said belt, and means for passing a continuous stream of hydrocarbon gases through said catalyst tubes in contact with said catalyst.

JAMES M. PAGE, Jr.
VANDERVEER VOORHEES.